June 24, 1958 B. I. ULINSKI 2,840,175
INDUSTRIAL TRUCK HANDLE OPERATED CONTROL
Filed Feb. 9, 1956 3 Sheets-Sheet 1

INVENTOR.
B. I. Ulinski
BY
A. H. Golden
ATTORNEY

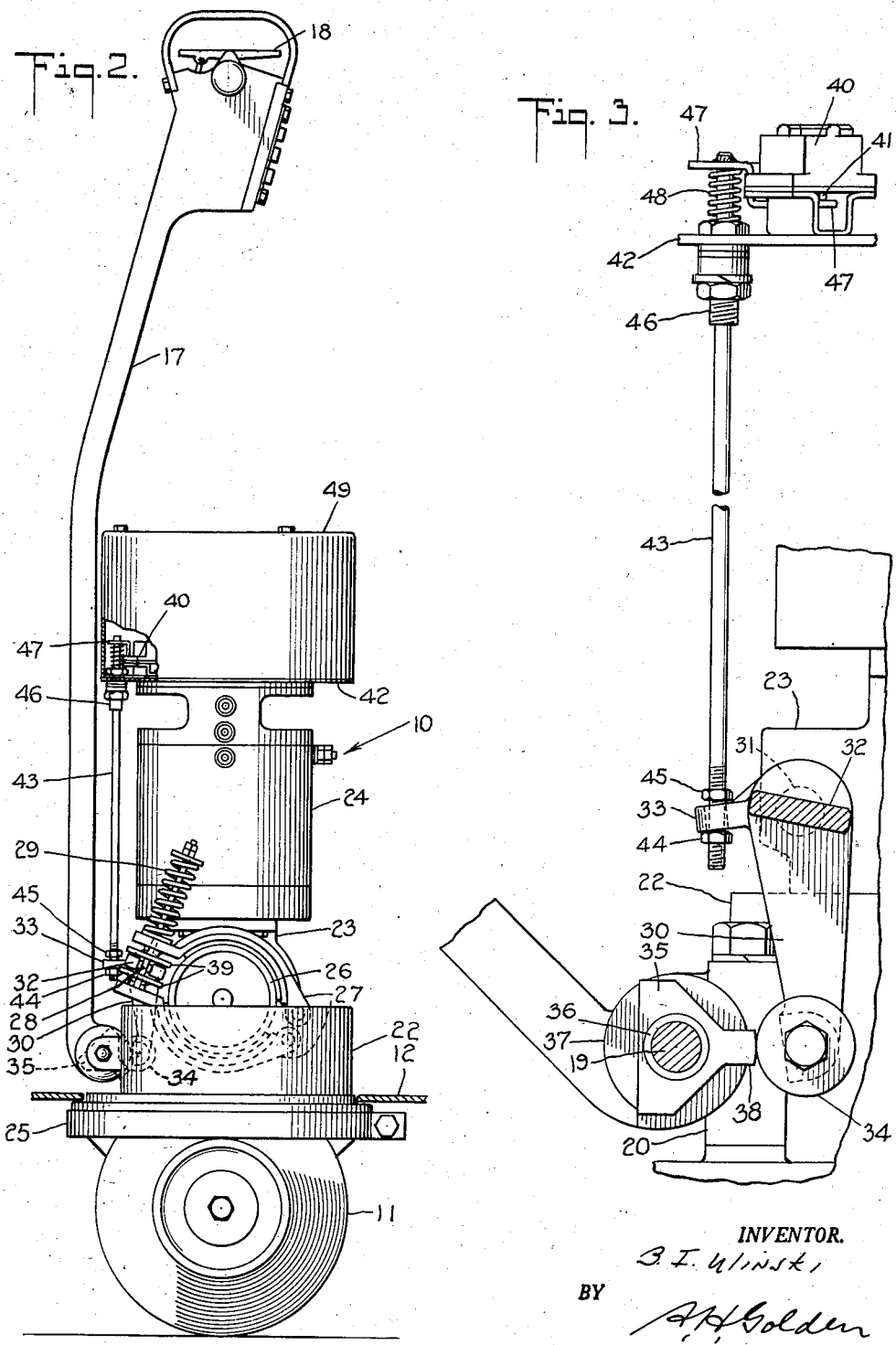

June 24, 1958  B. I. ULINSKI  2,840,175
INDUSTRIAL TRUCK HANDLE OPERATED CONTROL
Filed Feb. 9, 1956  3 Sheets-Sheet 3
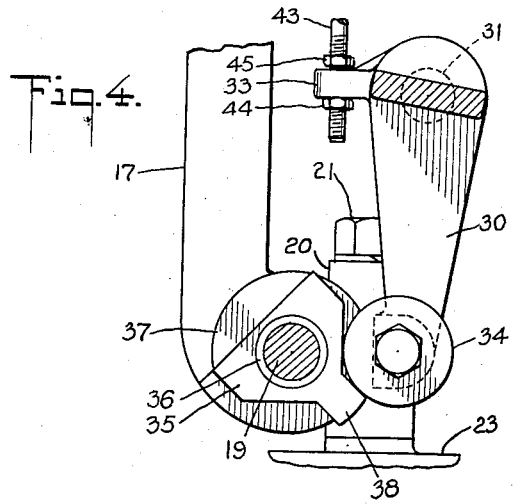
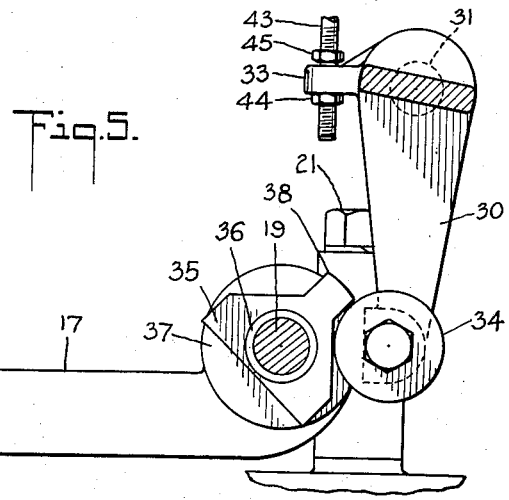
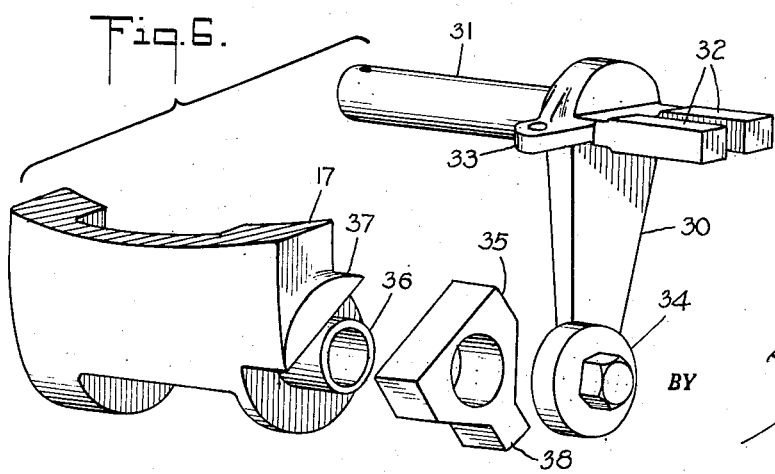
INVENTOR.
B. I. Ulinski
BY
ATTORNEY Omitted header …

United States Patent Office 2,840,175
Patented June 24, 1958

2,840,175

INDUSTRIAL TRUCK HANDLE OPERATED CONTROL

Bronislaus I. Ulinski, Flossmoor, Ill., assignor to The Yale & Towne Manufacturing Company, Stamford, Conn., a corporation of Connecticut Application February 9, 1956, Serial No. 564,421

7 Claims. (Cl. 180—13)

This invention relates to a motorized industrial truck of the type in which a combined steering and traction unit mounted at one end of the truck is adapted for manual rotation relatively to the truck in order to steer and drive the truck. Steering and traction units of this general class comprise a motor, a combined steering and traction wheel, and drive means between the motor and wheel. The unit is equipped also with means for braking the steering and traction wheel, and a handle is pivoted to the unit for rotating it in order to steer the truck. At the end of the handle, control means in the form of switches are mounted for the purpose of controlling the operation of the steering and traction unit, as well as other operating parts on the truck.

Certain earlier patents in this art show trucks of the particular class in which the vertical swinging movement of the steering handle controls the brake of the traction unit, with this handle movement controlling also switch means that are in series relationship to the control means at the end of the steering handle. Because of the particular arrangement, in order to drive the truck forwardly or rearwardly, it is necessary not only to operate the control means at the end of the steering handle, but also to swing the steering handle from a vertical position toward an intermediate position that is more normal for the operation of the truck. The construction is further such that if the steering handle is moved to a full horizontal position, the circuit controlled by the swinging thereof is opened so that the drive of the traction motor is stopped while at the same time the brake is applied. Therefore, there is provided in essence a control that will stop the operation of the traction motor and will apply the brake if the steering handle is in either a vertical position or a horizontal position. Only through the placing of the steering handle in an intermediate position will the control means at the end of the steering handle be conditioned to control the traction motor for driving in a forward and rearward direction as well as at different speeds.

In prior art trucks of the particular class, extremely complicated and costly means have been provided for obtaining the control that is effected through the positioning of the steering handle. Thus, commutation type switches have been utilized, and complicated lever operated switching means have been developed. In addition, it has been necessary to employ rather complex brake operating means. Not only are the electric switches and other control means rather involved, but their nature has been such that they could not readily be made spark-proof.

As a feature of my invention, I contribute exceedingly simple brake operating means adapted for actuation by the swinging movement of my steering handle. As a further feature of the invention, I provide extremely simple means for operating, with full spark-proofing, the electric control means for the traction motor.

More in detail, I provide extremely effective direct acting means that are operated by the swinging movement of the steering lever for releasing the brake when the steering lever is in an intermediate position while applying the brake when the steering lever is in vertical and horizontal positions. I utilize those means further for actuating electric switch means for my traction motor, the actuating means being of such construction that the switch means may very easily be enclosed and fully spark-proofed.

As a more particular feature of the invention, the steering lever is provided with an integral operating member that is adapted when rotated by the steering lever to move a control device and thereby to release the brake upon the swinging movement of the steering lever to a zone intermediate its fully upright position and full horizontal position. I provide also the operation of a simple rod by the swinging of the steering lever, this simple rod traversing an opening in a spark-proof casing in which may be mounted any type of electric control apparatus for controlling the drive of the traction motor.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawings,

Fig. 2 shows my control on the steering and traction unit of the truck.

Fig. 3 shows the position of the control when the steering handle is in an intermediate position.

Figs. 4 and 5 are like a portion of Fig. 3 but show the handle in vertical and horizontal positions.

Fig. 6 is an exploded view showing parts of my control.

Figure 1:
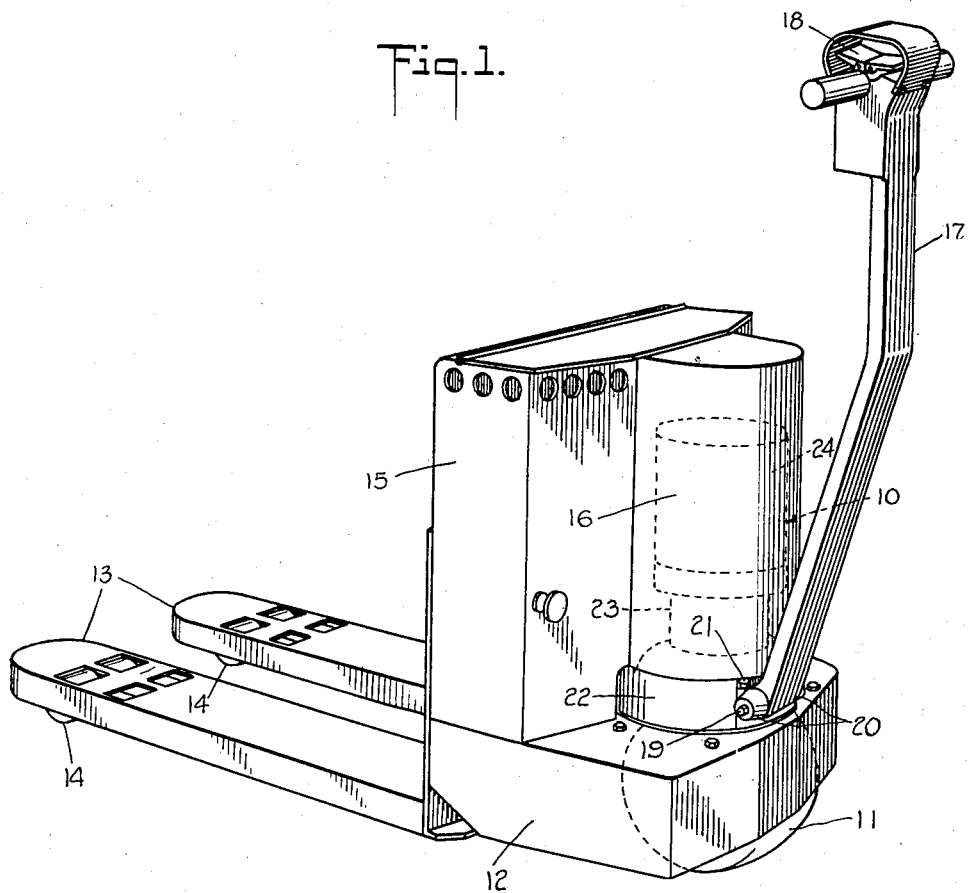
Fig. 1 shows an industrial truck that utilizes my novel brake and switch control.

Referring now more particularly to Fig. 1 of the drawings, I show a truck of the class described having at one end a combined steering and traction unit 10 that has a traction wheel 11, and that is mounted to rotate on the truck frame 12 whereby to steer and to drive the truck. I show the truck constructed at its opposed end with a load platform 13 and load wheels 14 supporting that end of the truck. On the truck frame 12 just rearwardly of the steering and traction unit 10 is a removable cover 15 for a battery, not shown, that cover having a curved part 16 that encloses the upper portion of the unit 10.

The steering and traction unit 10 has a steering handle 17 that is mounted for vertical swinging movement, as is usual in trucks of this class, with control means 18 on the end of the handle so that the operator can control conveniently the operation of the truck. As particular means for mounting the handle 17, I prefer to utilize a pivot shaft 19 on a pair of brackets 20, these brackets 20 being secured to the unit 10 through bolts 21, one of which is shown in Figs. 1 and 3. This places the handle mounting below the bottom edge of the curved cover part 16, and to enclose the unit 10 at opposed sides of handle 17 I prefer to equip the unit with a curved plate 22.

As best shown in Fig. 2, the steering and traction unit 10 has a gear casing 23 and a traction motor 24 mounted on the upper end of that casing. It will be appreciated that the motor 24 drives the traction wheel 11 through gears in the casing 23, and that the casing has upon it a circular bearing 25 through which the unit 10 is mounted for steering rotation relatively to the truck frame 12. At this point I shall call attention to the fact that the steering and traction unit 10 is equipped with a brake drum 26 that rotates with the gears in casing 23, and a pair of brake shoes 27 for the drum 26. A rather usual rod and spring arrangement 28, 29 presses the brake shoes 27 normally against opposed sides of the drum 26 whereby to brake or to lock traction wheel 11. I believe it will not be necessary to describe in further detail the construction of the gear casing 23 and the driving means on that casing, since those details are not important to an understanding of my novel switch and brake control. I do prefer, however, to utilize the construction that I describe in my application entitled Gear Drive Steering and Traction Unit, filed February 1, 1956, Serial No. 562,710.

In the extremely novel control that I contribute by my invention, I utilize a control device 30 that is shown assembled in Figs. 2 and 3, but that I show in more detail in Fig. 6. I prefer to utilize for the control device 30 a lever that is pivoted on the gear casing 23 through a shaft portion 31, that lever having a longitudinal cam 32 for actuating the brake, and an arm 33 for actuating a switch, as I shall presently describe. I equip the end of the lever 30 with an operating surface 34, utilizing preferably a roller for this purpose. My novel control has further an actuating member 35 that moves with the steering handle 17, this member 35 acting against the operating surface or roller 34 on lever 30 as the handle swings vertically on pivot 19.

As will be understood from Figs. 3 and 6, I prefer to mount the actuating member 35 on a sleeve portion 36 in the axis of pivot shaft 19, with one end of member 35 opposed to a segment 37 on steering handle 17 whereby the member will rotate integrally with the handle. The opposed end of the actuating member 35 has a cam portion 38 adapted to act against the roller 34 on control device or lever 30. I so form the cam portion 38 that lever 30 will be in an initial position when steering handle 17 is vertical or horizontal, as in Fig. 4 or 5. When steering handle 17 swings to an intermediate position, as in Fig. 3, cam portion 38 will move control lever 30 to a second position shown in Fig. 3, but will bypass roller 34 upon further swinging of the handle so that lever 30 will move again to its initial position shown in Fig. 4 or 5. It is important to realize that this construction enables the handle 17 when swinging vertically to actuate the control lever 30 through exceedingly simple means, without commutator rings or electric contacts of any kind. Moreover, since my actuating member 35 acts merely through contact with roller 34, it is a very simple matter to assemble or disassemble that member and the handle 17 relatively to the steering and traction unit 10, when that is required.

Referring now to Fig. 2, I arrange the cam 32 on control lever 30 in a space between end parts 39 on the opposed brake shoes 27. When control lever 30 is in its initial position, cam 32 will be somewhat spaced from the shoe parts 39, so that there will be a certain amount of lost motion between the lever and shoes, as will be appreciated from Fig. 2. This lost motion naturally will enable the spring 29 to press the brake shoes 27 to full locking position when control lever 30 is in its initial position. When lever 30 rotates to its second position, cam 32 will move brake shoes 27 to release position relatively to the drum 26.

I further utilize in my novel control switch means 40 that are shown in Figs. 2 and 3. These switch means 40 act through a circuit that is conventional and that does not form a part of my invention, and it is necessary to know merely that switch means 40 when in closed position places the traction motor 24 under the control of the control means 18 on the end of steering handle 17. In my preferred construction, switch means 40 comprise a switch of the type that is spring pressed to circuit closing position, with a button 41, Fig. 3, that when depressed opens the circuit.

I mount the switch means 40 on the upper portion of the steering and traction unit 10, utilizing for this purpose a mounting plate 42 on the top of motor 24. I actuate the switch means 40 through a rod 43 that extends vertically from the arm 33 on control lever 30, the lower end of this rod being positioned in an opening in arm 33 and equipped with a nut 44 against which the arm acts. The rod 43 may have a further nut 45 above arm 33, but that is not essential. The upper end of rod 43 extends above the switch mounting plate 42, that plate being equipped with a bushing 46 in which the rod 43 slides.

On the upper end of the rod 43 I secure integrally a part 47 that is in opposed relation to the operating button 41 on switch 40, and I utilize a coil spring 48 that presses rod 43 and part 47 upwardly toward position depressing the switch button 41. Thus, spring 48 will effect circuit opening movement of the switch 40 when control lever 30 moves to its initial position, as in Fig. 2. Thereby the motor circuit will be opened when control lever 30 effects braking movement of brake shoes 27. By pressing rod 43 upwardly, the spring 48 naturally will press the control lever 30 fully to its initial position when that lever is not held by actuating member 35. It is a feature of this construction that the spring 48 will press the switch 40 to circuit opening position independently of the brake spring 29, and that the brake spring can not apply pressure to switch button 41. This will be understood when considering the lost motion that I have already described between the cam 32 on control lever 30 and the brake shoe parts 39. Moreover, the nuts on vertical rod 43 will be so adjusted that the control lever 30 can not contribute upward pressure on rod 43.

It is extremely important to realize that through the construction I have described, I enable the steering handle 17 to actuate the motor control switch 40 through extremely simple means that very easily may be sparkproofed. Thus, it is a very simple matter to apply to the switch mounting plate 42 a cover 49, as shown in Fig. 2, whereby to form a spark-proof casing completely enclosing switch means 40. It will be remembered also that I do not require electrical contacts on the pivoted mounting of steering handle 17, and I thus eliminate a further source of sparks.

The extremely novel control that I have described will act very easily and positively to stop the truck when the steering handle moves to either vertical or horizontal position, with the control means on the end of the handle conditioned to control the motor only when the handle is in an intermediate operating position. My novel control does this through exceedingly simple means, with the brake and control switch pressed through simple but very effective spring action. Moreover, my construction enables me very easily to spark-proof the control. In fact, I eliminate electrical contacts associated with the mounting of the steering handle, and by this feature I simplify very considerably the assembly of the handle. In addition, my control requires but little space so that it is possible to make the steering and traction unit very slim. I believe that those persons skilled in the art will now understand the extremely novel handle operated control that I have conceived, and will appreciate fully the very considerable value of my invention.

I now claim:

1. In a truck of the class described, a steering and traction unit mounted for rotation whereby to steer the truck and comprising a raction wheel, a motor on the upper end of the unit for driving the traction wheel, a steering handle pivoted on said steering and traction unit, a lever pivoted on said steering and traction unit and equipped with an operating surface, an actuating member movable with said steering handle in position to act against said operating surface as the handle rotates on its pivot between a vertical position and a horizontal position, said actuating member formed to move into contact with said operating surface of the lever for rotating the lever from an initial position to a second position during the first part of the handle rotation away from its vertical position, the continued rotation of said steering handle to its full horizontal position moving said actuating member to bypass and to leave said operating surface of the lever, a brake on said steering and traction unit, a spring pressing said brake toward locked or braking position, means whereby said lever when rotating to its said second position moves said brake to release position through yielding of the spring, said spring acting when the actuating member bypasses and leaves the operating surface of the lever to rotate said lever toward its initial position while moving the brake to locking position, switch means on said motor, a casing enclosing said switch means, an arm on said lever, a rod extending vertically from said arm into said casing whereby the lever when moving the brake to release position moves the switch means to circuit closing position, and a spring acting through said rod for pressing said lever to its initial position, said spring effecting movement of the switch means to circuit opening position independently of the spring that presses the brake.

2. In a truck of the class described, a steering and traction unit mounted for rotation whereby to steer the truck, a steering handle pivoted on said steering and traction unit, a lever pivoted on said steering and traction unit and equipped with an operating surface, an actuating member movable with said steering handle as said handle moves on its pivot between a vertical position and a horizontal position, said actuating member spaced from the operating surface of said lever when the steering handle is in its vertical and horizontal positions, said actuating member during the first part of its movement as the handle rotates from its vertical position contacting said operating surface of the lever for rotating the lever from an initial position to a second position, the continued rotation of said steering handle to its full horizontal position then moving said actuating member to bypass and to leave said operating surface of the lever to effect rotation of the lever back to said initial position, means whereby said lever when rotating to said second position effects the release of a brake for said steering and traction unit, that brake being in locked or braking position when said lever is in said initial position, switch means on the upper portion of said steering and traction unit, an arm on said lever, and a rod extending from said arm whereby the swinging of the steering handle on its pivot effects the operation of the switch means in predetermined relation to the operation of the brake.

3. In a truck of the class described, a steering and traction unit mounted for rotation whereby to steer the truck, a steering handle pivoted on said steering and traction unit, a control device mounted for movement on said steering and traction unit and equipped with an operating surface, an actuating member rotating with said steering handle in coacting relation to said operating surface as the handle rotates on its pivot between a vertical position and a horizontal position, said actuating member spaced from the operating surface of the control device when the steering handle is in its vertical and horizontal positions, said actuating member formed to move into contact with said operating surface of the control device for moving the device from an initial position to a second position during the first part of the handle rotation away from its vertical position, the continued rotation of said steering handle to its full horizontal position then rotating said actuating member relatively to the operating surface of the control device to effect movement of the device back to said initial position, means whereby said device when moving to said second position effects the release of a brake for said steering and traction unit, that brake being in locked or braking position when said control device is in said initial position, a casing for switch means on the upper portion of said steering and traction unit, a rod extending from said control device into said casing for operating the switch means, and a part on the control device effecting movement of said rod when said actuating member moves the device from its initial to its second position, whereby the swinging of the steering handle on its pivot effects through said control device the operation of the switch means in its casing in predetermined relation to the operation of the brake.

4. In a truck of the class described, a steering and traction unit mounted for rotation whereby to steer the truck and comprising a traction wheel, a motor on the upper end of the unit for driving the traction wheel, a steering handle pivoted on said traction unit, a control device mounted for movement on said traction unit and equipped with an operating surface, an actuating member mounted to rotate with said steering handle in position to act against said operating surface as the handle rotates on its pivot from a vertical position toward a horizontal position, said actuating member spaced from the operating surface of the control device when the steering handle is in its vertical and horizontal positions, said actuating member formed to move into contact with said operating surface of the control device for moving the device from an initial position to a second position during the first part of the rotation of the handle away from its vertical position, the rotation of said steering handle to its full horizontal position effecting movement of the actuating member past said operating surface of the control device with said control device then moving back to said initial position, means whereby said control device when moving to said second position effects the movement of a brake on said steering and traction unit from braking to release positions, that brake being in locked or braking position when said control device is in said initial position, a casing for switch means on said motor, a rod extending vertically from said control device into said casing for actuating the switch means on the motor, and a part on the control device effecting movement of said rod when the actuating member moves said device from its initial to its second position, whereby the swinging of the steering handle on its pivot effects through said control device the control of the switch means in its casing coincidental with the control of the brake.

5. In a truck of the class described, a steering and traction unit mounted for rotation whereby to steer the truck, a steering handle pivoted on said steering and traction unit, a control device mounted for movement on said steering and traction unit and equipped with an operating surface, an actuating member mounted to rotate with said steering handle in position to act against said operating surface as the handle rotates on its pivot between a vertical position and a horizontal position, said actuating member spaced from the operating surface of the control device when the steering handle is in its vertical and horizontal positions, said actuating member formed to move into contact with said operating surface of the control device for moving the device from an initial position to a second position during the first part of the handle rotation away from its vertical position, the continued movement of said steering handle to its full horizontal position moving said actuating member to bypass and to leave said operating surface of the control device, a brake on said steering and traction unit, a spring pressing said brake toward locked or braking position, means whereby said control device when moving to its said second position moves said brake to release position through yielding of the spring, said spring acting when the actuating member bypasses the operating surface of the control device to move said control device back toward its initial position while moving the brake to locking position, a rod extending from said control device to switch means on the steering and traction unit, and a part on the control device effecting movement of said rod when the actuating member moves said device from its initial to its second position, whereby the swinging of the steering handle on its pivot controls the operation of the switch means in predetermined relation to the operation of the brake.

6. In a truck of the class described, a steering and traction unit mounted for rotation whereby to steer the truck and comprising a traction wheel, a brake for the traction wheel on said steering and traction unit, a motor on the upper end of the unit for driving the traction wheel, a casing on said motor, switch means for the motor in said casing, a steering handle pivoted on said steering and traction unit, a control device mounted for movement on said traction unit and equipped with an operating surface, an actuating member mounted to rotate with said steering handle in position to act against said operating surface as the handle rotates on its piovt from a vertical position toward a horizontal position, said actuating member spaced from the operating surface of the control device when the steering handle is in its vertical and horizontal positions, said actuating member formed to move into contact with said operating surface of the control device for moving the device from an initial position to a second position during the first part of the rotation of the handle away from its vertical position, the rotation of said steering handle to its full horizontal position effecting movement of the actuating member past said operating surface of the control device, a rod actuated by said control device and extending vertically into said casing, means through which the rod acts when the control device moves to its second position to move the switch means to circuit closing position, a spring pressing said rod and effective when the actuating member moves past the operating surface of the control device to move the device back to its initial position with the switch means then moving to circuit opening position, and means whereby said control device effects the operation of the brake in predetermined relation to the operation of the switch means.

7. In a truck of the class described, a steering and traction unit mounted for rotation whereby to steer the truck and comprising a brake and switch means for the unit, a steering handle pivoted on said steering and traction unit, a control device mounted for movement on said steering and traction unit and equipped with an operating surface, an actuating member rotating with said steering handle in position to act against said operating surface as the handle rotates on its pivot between a vertical position and a horizontal position, said actuating member spaced from the operating surface of the control device when the steering handle is in its vertical and horizontal positions, said actuating member formed to move into contact with said operating surface of the control device for moving the device from an initial position to a second position during the first part of the handle rotation away from its vertical position, the continued rotation of said steering handle to its full horizontal position moving said actuating member to bypass and to leave said operating surface on the control device, a spring pressing said brake toward locked or braking position, means whereby said control device when moving to said second position moves said brake to release position through yielding of its spring, said spring acting when the actuating member bypasses and leaves the operating surface of the control device to move said control device back toward its initial position while moving the brake to locking position, a rod extending from said control device to said switch means, a part on the control device moving the switch means as said actuating member and spring move the control device between its initial and second position, a spring pressing the switch means toward position corresponding to the initial position of the control device, and lost motion means enabling said spring that presses the switch means to move the switch means to said position independently of the spring that presses the brake when the actuating member bypasses the control surface of the control device.

References Cited in the file of this patent
UNITED STATES PATENTS

| | | |
|---|---|---|
| 2,175,037 | Smith | Oct. 3, 1939 |
| 2,209,356 | Schreck | July 30, 1940 |
| 2,325,396 | Hastings | July 27, 1943 |
| 2,399,605 | Schroeder | Apr. 30, 1946 |
| 2,592,091 | Weaver | Apr. 8, 1952 |
| 2,645,297 | Wennberg et al. | July 14, 1953 |
| 2,651,379 | Elliott et al. | Sept. 8, 1953 |